US010408686B2

(12) United States Patent
Newport et al.

(10) Patent No.: US 10,408,686 B2
(45) Date of Patent: Sep. 10, 2019

(54) GEL-BASED TEMPERATURE INDICATORS (71) Applicant: Temptime Corporation, Morris Plains, NJ (US)

(72) Inventors: John Newport, Chadds Ford, PA (US); Mohannad Abdo, Clifton, NJ (US); Dawn E. Smith, Martinsville, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 179 days.

(21) Appl. No.: 15/402,678

(22) Filed: Jan. 10, 2017

(65) Prior Publication Data
US 2017/0205295 A1 Jul. 20, 2017

Related U.S. Application Data (60) Provisional application No. 62/279,529, filed on Jan. 15, 2016.

(51) Int. Cl.
G01K 11/06 (2006.01)
A23L 3/00 (2006.01)
G01K 11/18 (2006.01)
G01K 3/04 (2006.01)

(52) U.S. Cl.
CPC ............ *G01K 11/06* (2013.01); *A23L 3/00* (2013.01); *G01K 3/04* (2013.01); *G01K 11/18* (2013.01); *A23V 2002/00* (2013.01)

(58) Field of Classification Search
CPC .......... G01K 3/04; G01K 11/06; G01K 11/12; G01K 13/00; G01K 11/18; G01K 2207/04; G01N 33/02; G01N 21/78; G01N 21/29; G01N 2201/1211; A23L 3/00; A43B 7/28; A47J 41/0094

USPC ................. 374/100–106, 160; 116/216, 219
See application file for complete search history.

(56) References Cited

U.S. PATENT DOCUMENTS

| 3,122,921 | A | | 3/1964 | Koch | |
|---|---|---|---|---|---|
| 3,695,903 | A | * | 10/1972 | Telkes et al. | ............ G01K 3/04 116/207 |
| 3,954,011 | A | | 5/1976 | Manske | |
| 4,028,944 | A | | 6/1977 | Erb | |
| 5,709,472 | A | | 1/1998 | Prusik et al. | |
| 5,770,557 | A | | 6/1998 | Bruhnke | |
| 5,797,344 | A | * | 8/1998 | Ramsey | ............... G01N 31/229 116/206 |
| 7,022,213 | B1 | | 4/2006 | Austen et al. | |
| 7,388,814 | B2 | * | 6/2008 | Teffenhart | ................. G04F 1/00 116/200 |

(Continued)

OTHER PUBLICATIONS

PCT Search Report and Written Opinion dated Jun. 5, 2017 issued for International PCT Application No. PCT/US17/12973 filed Jan. 11, 2017.

(Continued)

*Primary Examiner* — Gail Kaplan Verbitsky
(74) *Attorney, Agent, or Firm* — K&L Gates LLP (57) ABSTRACT Disclosed herein are gel-based temperature indicators that include a first absorbent substrate having opposing first and second faces and a first gel coupled to the first face. In some embodiments, the first gel is a gel at a first temperature, and the first gel turns to liquid at a second temperature. In some embodiments, the first absorbent substrate is configured to allow the first gel upon turning to liquid to diffuse through the first face toward the second face.

38 Claims, 4 Drawing Sheets (56) References Cited

U.S. PATENT DOCUMENTS

| | | | |
|---|---|---|---|
| 7,878,410 B2* | 2/2011 | Norrby | B41M 5/305 235/462.01 |
| 7,940,605 B2 | 5/2011 | Ambrozy et al. | |
| 8,091,503 B2* | 1/2012 | LeFevre | G01K 11/06 116/216 |
| 8,182,430 B2* | 5/2012 | Short | G01K 11/16 374/162 |
| 8,430,053 B2 | 4/2013 | Taylor et al. | |
| 8,562,208 B2 | 10/2013 | Yeager et al. | |
| 8,695,528 B2* | 4/2014 | Boyaci | G01K 3/04 116/216 |
| 8,979,361 B2 | 3/2015 | Selman et al. | |
| 9,581,501 B2* | 2/2017 | Kozono | B32B 7/12 |
| 9,618,398 B2* | 4/2017 | Deng | B65D 79/02 |
| 9,683,872 B2* | 6/2017 | Noe | G09F 3/02 |
| 2001/0027741 A1* | 10/2001 | Qiu | G01K 3/04 116/207 |
| 2007/0084084 A1* | 4/2007 | Rich | A43B 7/142 36/44 |
| 2008/0017578 A1* | 1/2008 | Childs | B01D 63/06 210/650 |
| 2008/0056329 A1* | 3/2008 | Smith | G01K 11/06 374/106 |
| 2008/0187021 A1* | 8/2008 | Haarer | G01K 3/04 374/102 |
| 2011/0074863 A1* | 3/2011 | Platt | B41J 2/19 347/20 |
| 2013/0038454 A1 | 2/2013 | Cooperman et al. | |
| 2013/0081566 A1 | 4/2013 | Boyaci et al. | |
| 2013/0128921 A1* | 5/2013 | Yeager | G01K 11/12 374/162 |
| 2013/0220209 A1* | 8/2013 | Rabinowitz | G01K 3/04 116/206 |
| 2016/0303291 A1* | 10/2016 | Canal | A61L 27/20 |

OTHER PUBLICATIONS

Sartorius, "Filter Papers for the Laboratory and Industry" 2015, pp. 7-8, retrieved from the Internet: <URL: https://www.sartorius.com/_ui/images/h02/hd8/8814003290142.pdf>.

* cited by examiner

GEL-BASED TEMPERATURE INDICATORS

CROSS REFERENCE TO RELATED APPLICATIONS

The present application claims the benefit of U.S. Provisional Patent Application No. 62/279,529 filed Jan. 15, 2016, the entire contents of which is hereby incorporated by reference in its entirety.

BACKGROUND

Many commercial products are sensitive to temperature conditions, such as freezing, thawing, high or low temperatures, and/or extended periods of time at elevated temperature, and may lose efficacy or quality under any of these conditions. Examples of temperature-sensitive commercial products include certain pharmaceuticals, medical products, and foodstuffs as well as some industrial products. There is a continued need for a variety of effective temperature condition indicators.

SUMMARY

Disclosed herein are gel-based temperature indicators that include a first absorbent substrate having opposing first and second faces and a first gel coupled to the first face. In some embodiments, the first gel is a gel at a first temperature, and the first gel turns to liquid at a second temperature. In some embodiments, the first absorbent substrate is configured to allow the first gel upon turning to liquid to diffuse through the first face toward the second face. In some embodiments, the ratio of the area of second face in mm$^2$ to the thickness of the first absorbent substrate in mm is at least 10 mm.

According to some embodiments of gel-based temperature indicators, the first absorbent substrate and the first gel are contained within a housing. In some embodiments, if a temperature condition is met, a detectable change in appearance of the first absorbent substrate occurs. In some embodiments, the housing is configured so that the detectable change in appearance of the first absorbent substrate is detectable externally of the temperature condition indicator by visual inspection or by an optical instrument.

According to some embodiments, a label for a perishable good may include a gel-based temperature indicator according to the present disclosure.

Also disclosed herein are methods of protecting a perishable item. In some methods, the perishable item is coupled with a gel-based temperature indicator so that the temperature condition indicator is subject to substantially the same temperature conditions as the perishable item.

These and other features are disclosed in greater detail in the accompanying figures and the Detailed Description below.

The embodiments illustrated in these figures are discussed in greater detail below.

DETAILED DESCRIPTION

Administration of vaccines provides a cost-effective health intervention that can save or improve, millions of lives globally. The biological activity of vaccines is attributable to complex organic macromolecules, for example, proteins, having particular three-dimensional conformations. When exposed to extremes in temperature, including freezing temperatures or near-freezing temperatures, high temperatures, or warm temperatures for an extended period of time, vaccines can lose potency. A low-potency vaccine, if administered to a subject, may fail to protect the subject from a serious or fatal disease.

Warm temperatures can also affect vaccine quality adversely. Because of this, vaccines are generally refrigerated, or cooled by other suitable means, during storage and distribution to end-users. Such cooling means may introduce a risk that some or all vaccine samples in a batch of samples may suffer exposure to freezing or near-freezing temperatures due to cold spots within the container, poorly controlled refrigeration, or other factors. Similar considerations apply to various other commercial products, for example biological pharmaceuticals in some genetically engineered pharmaceuticals, as well as food stuffs, and other commercial products, some of which are described elsewhere herein.

To help mitigate problems associated with undesirable temperature conditions, a temperature condition indicator can be associated with the vaccine, or another host product, to provide an optical signal alerting a health worker, or other end-user, that the vaccine may have lost potency and possibly should not be used.

There is a need for temperature indicators that register relatively small excursions from ambient temperature. For example if the controlled room temperature (CRT) is 25° C. then it may be important to register deviations up or down deviations from CRT. Suitable deviations may be 5, 10, or 15 degrees.

The disclosure herein covers both ascending (or increasing) temperature indicators and descending (or decreasing) temperature indicators that have the sensitivity and programmability to meet the above objectives as well as being able to be used as more conventional freeze indicators.

The present disclosure is directed to gel-based temperature indicators in which one or more gels are used. Upon the occurrence of a temperature increase or decrease, the indicators disclosed herein are configured to allow the one or more gels to diffuse through one or more absorbent substrates thereby providing an indication of the temperature increase or decrease. In some embodiments, the gel-based temperature indicator is capable of providing an indication of both a temperature increase and a temperature decrease, though some embodiments are configured to provide an indication of only a temperature increase or only a temperature decrease.

The gel-based temperature indicators disclosed herein take advantage of the ability of some gels to liquefy or behave more like a liquid at certain temperatures. Some gels behave more like a liquid than a solid when the temperature increases, whereas some gels behave more like a liquid than a solid when the temperature decreases. The gels contemplated herein include reactively modified gels.

According to the present disclosure, the term "gel" includes its generally accepted meaning in the art as well as meaning a colloid in which the disperse phase has combined with the dispersion medium to produce a semisolid material. It is generally understood that a gel is a solid, jelly-like material that can have properties ranging from soft and weak to hard and tough. Gels can include a substantially dilute cross-linked system, which exhibits no flow when in the steady-state. By weight, many gels are mostly liquid, yet they may behave like solids due to a three-dimensional cross-linked network within the liquid. It is the crosslinking within the fluid that can give a gel its structure (i.e., hardness) and contribute to the adhesive stick (i.e., tack). In this way gels can be a dispersion of molecules of a liquid within a solid in which the solid is the continuous phase and the liquid is the discontinuous phase.

According to some embodiments, a gel is a substance that at a certain temperature or range of temperatures acts as a solid but when exposed to a temperature beyond an allowed deviation acts as a liquid. For, example in some embodiments, a gel is a substance that at 25° C. acts as a solid but that at a temperature 5° C., 10° C., 15° C. above or below 25° C. acts as a liquid.

In some embodiments, the gel undergoes a transition from a gel to a liquid as temperature increases, or at a high temperature threshold, such as when the temperature increases to a temperature in a range such as 0-2° C., 2-4° C., 4-6° C., 6-8° C., 8-10° C., 10-12° C., 12-14° C., 14-16° C., 16-18° C., 18-20° C., 20-22° C., 22-24° C., 24-26° C., 26-28° C., 28-30° C., 30-32° C., 32-34° C., 34-36° C., 36-38° C., 38-40° C., 40-42° C., 42-44° C., 44-46° C., 46-48° C., 48-50° C., 50-52° C., 52-54° C., 54-56° C., 56-58° C., 58-60° C., 0-5° C., 5-10° C., 10-15° C., 15-20° C., 20-25° C., 25-30° C., 30-35° C., 35-40° C., 45-50° C., 50-55° C., 55-60° C., 0-10° C., 10-20° C., 20-30° C., 30-40° C., 40-50° C., 50-60° C., 0-20° C., 20-40° C., 40-60° C., or any temperature in a range bounded by any of these values.

In some embodiments, the gel undergoes a transition from a gel to a liquid as temperature decreases, or at a low temperature threshold, such as when the temperature decreases to a temperature in a range such as 0-2° C., 2-4° C., 4-6° C., 6-8° C., 8-10° C., 10-12° C., 12-14° C., 14-16° C., 16-18° C., 18-20° C., 20-22° C., 22-24° C., 24-26° C., 26-28° C., 28-30° C., 30-32° C., 32-34° C., 34-36° C., 36-38° C., 38-40° C., 40-42° C., 42-44° C., 44-46° C., 46-48° C., 48-50° C., 50-52° C., 52-54° C., 54-56° C., 56-58° C., 58-60° C., 0-5° C., 5-10° C., 10-15° C., 15-20° C., 20-25° C., 25-30° C., 30-35° C., 35-40° C., 45-50° C., 50-55° C., 55-60° C., 0-10° C., 10-20° C., 20-30° C., 30-40° C., 40-50° C., 50-60° C., 0-20° C., 20-40° C., 40-60° C., or any temperature in a range bounded by any of these values.

The temperature indicators of this disclosure are configured to allow the gel to flow or diffuse through a porous or absorbent material or substrate when the gel acts as a liquid. Moreover, the temperature indicators are configured such that this diffusion into and/or through the absorbent material effects a change in the temperature indicator.

In some embodiments, that change in the temperature indicator comprises a visual change. The visual change could be the result of the gel having an inherent color that, when it diffused into the absorbent material affects the visual appearance, color, brightness, etc. of that material. The visual change could be the result of the gel having additives that have an inherent color that, when it diffused into the absorbent material affects the visual appearance, color, brightness, etc. of that material. The visual change could be the result of the gel interacting with a second gel in the material. The second gel could also have an inherent color or could include an additive with a color. In some embodiments the respective additives of the two gels are able to react with other, thereby affecting a change in the visual appearance of the absorbent material. Any type of two (or more) component chemical reaction can be used, provided that the reaction results in the color change. For example, some color-changing chemical reactions, such as acid-base reactions, are affected by pH. Some color-changing chemical reactions are oxidation-reduction reactions.

In some embodiments, the change in the temperature indicator comprises an electrochemical change. For example, presence of the gel in the absorbent material—which may include a conductive additive—could allow an electric current to pass through the absorbent material. In such embodiments, the time temperature indicators can be configured such that the electric current causes a signal to be sent either by wire or wirelessly to a monitoring device. In some embodiments, the absorbent material is not itself conductive or is only minimally conductive such that the addition of conductive particles or a conductive liquid affects the conductivity or resistance of the absorbent substrate.

Examples of gels that turn to liquid with decreasing temperature include polyethylene oxide/polypropylene oxide block copolymers such as those commercially available as Pluronics™ and PPO/PEO/PPO triblock polymers commercially available as Poloxomers. There are numerous other examples of this type of polymer including but not limited to hydroxypropyl cellulose, poly(N-ethylacrylamide), poly(N,N'-diethylacrylamide), poly(N-n-propylacrylamide), poly(N-n-propylmethacrylamide), poly(N-isopropylacrylamide), poly(N-isopropylmethacrylamide), poly(N-cyclopropylacrylamide), poly(N-(L)-(1-hydroxymethylpropylmethacrylamide), poly(N-acryloylpyrrolidone), poly(N-acryloylpiperidene), poly(N-vinylcaprolactam), poly(N-vinylpropylacetamide), poly(N-vinyl-5-methyl-2-oxazolidone), poly(N-vinylisobutyramide), poly(L-proline), poly(N-acryloyl-4-trans-hydroxy-L-proline methyl ester), poly(methyl-2-isobutyracrylate), poly(2-ethyl-2-oxazolidone), poly(2-n-propyl-2-oxazolidone), poly(2-isopropyl-2-oxazolidone), and polyvinyl methyl ether, polyethylene oxide (also known as polyethyleneglycol), poly(propyleneoxide) (also known as poly(propyleneglycol)), poly(ethyleneoxide) and poly(propyleneoxide) copolymers, poly(methylvinylether), poly(2-ethoxyethylvinylether), poly(2-(2-ethoxy)ethoxyethylvinylether), poly(4-hydoxybutylvinylether), poly(methylglycidylether), poly(ethylglycidylether), poly(2-ethoxy-2-oxo-1.3.2-dioxaphospholane), poly(2-isopropoxy-2-oxo-1.3.2-dioxaphospholane) and certain synthetic polypeptides.

The temperature at which gels of this type transition from a gel to a liquid, besides being a material property in a given solvent system, can be adjusted up or down with suitable adjuvants or humectants. Thus the transition temperature for aqueous PEO/PPO polymer gels, and many others besides, can be adjusted downwards with polyols such as glycerol, mannitol, sorbitol, sucrose, triethanolamine, tris(hydroxymethyl) methane and the like as well as with chaotropes such as ammonium sulfate and the like. Conversely the transition temperature can be adjusted upwards with simple alcohols such as ethanol, propanol as well as some surfactants and kosmotropes and the like. This provides broad formulating ability and control of the transition temperature.

Examples of gels that turn to liquid with increasing temperature include gelatin (which liquefies at 35° C.) and agarose (which liquefies at 60° C.). There are also aqueous and non aqueous gels that can be made by thickening liquid systems with high surface area particulates such as silicas and other micro and nano particles. Other examples include carrageenan, agar, and pectin.

Some embodiments utilize polyethylene oxide ("PEO")/polypropylene oxide ("PPO") block copolymer gels that convert to liquids at a programmable lower temperature based on the ratio of PEO/PPO and the liquid composition in which the block copolymer is dissolved. As noted previously, such liquid compositions can comprise water and humectants such as glycerol, sorbitol, mannitol, sugars and the like. These can serve to lower the temperature at which the gel turns to liquid. Alcohols can serve to elevate the temperature at which the gel turns to liquid. The general concept though can be applied to any gels that can be reactively modified.

If simple colorants are dissolved in two or more gels and the gels are placed side by side or one on top of the other, then, with time, the colorants could diffuse to the adjoining gel. This tends to preclude the use of such a system as ascending or descending temperature indicator as the shelf life will be limited or a false indication of the temperature event can occur. This potential problem can be addressed by diffusing one or more of the gels into an absorbent substrate, by placing a barrier between the gels, by placing the gels in layers on opposite sides of an absorbent substrate, or by other similar configurations.

This potential problem could also be addressed by modifying a polymer in a gel to include a coloring component that has is naturally colored, or can react to become colored or change color. For example, polymers, such as PEO/PPO polymers that have terminal hydroxyl groups that can be reacted with appropriate moieties. Examples include reactive dyes, such as those originally developed for cellulosic fibers, which contain vinyl sulfone or halotriazine groups, which readily react with polymer hydroxyl groups. Many of these dyes are commercially available such as Procion dyes. U.S. Pat. No. 5,770,557 describes the preparation of reactively dyed PEO/PPO polymers used as fabric softeners. Typically polymers such as PEO/PPO copolymers have molecular weights in the range of a few thousand to tens of thousands of Daltons. While these dye-reacted polymers can inter-diffuse, the high molecular weights may preclude any significant inter-diffusion in the time scales of interest to the present disclosure, thereby allowing the manufacture of commercially viable descending temperature indicators.

Instead of attaching chromophores to the terminal hydroxyl groups of the PEO/PPO polymers, acid or basic groups may be attached. If one gel has acid groups and the other basic groups, upon liquefying, they can interact to form an opaque solid. Alternatively, acid or basic modified gels can be used to trigger color changes in pH paper and the like when they liquefy (in which case it should be possible to use just a single gel rather than a plurality of gels as described in some locations herein). Other possibilities may present themselves to those skilled in the art.

In some embodiments, unreacted species are removed from the modified gels so that they do not interfere with the detection of the temperature event of interest.

The substrates or mats, such as an absorbent substrate, used in this disclosure may be a fibrous mat or comprised of any other materials such that capillaries or fine channels are formed within the interstices of the substrate. The substrate may comprise multilayers where the layers have different surface free energies such that, when the gel converts to or acts more like a liquid at the required temperature, it penetrates deeply into the substrate revealing the markings on the surface of the substrate. These markings serve to indicate that the high (or low) temperature event has occurred. When the temperature decreases (or increases, as the case may be) and the liquid converts back to a gel or acts more like a solid it will be trapped within the porous substrate. One way to ensure deep penetration is to have the surface layers of the substrate more hydrophobic than the interior of the substrate. Due to capillary forces, the gel, when it converts to a liquid, will penetrate into the substrate regardless of the orientation of the substrate.

Individual substrates or mats may be printed circuit boards or contain embedded wiring or discrete electronic components such as resistors, thermistors, thyristors, capacitors, inductors, coils, silicon controlled rectifiers, diodes, zener diodes, transistors, field effect transistors, integrated circuits such as operational amplifiers, timers, transmitters, receivers, logic gates—such as AND, NAND, OR, NOR and the like—microprocessors, moisture activated switches, antennae, etc.

In some embodiments, a mat may include a battery or elements that can be activated to form a functioning battery when the temperature event of interest occurs as is described in greater detail below.

Within a mat, areas of different porosity may be arranged. Some or all of its areas can be rendered entirely impervious if needed. An individual mat can itself be assembled from different materials.

Individual mats, rather than being uniformly porous can be engineered to contain microfluidics channels of any desired degree of complexity. Such channels can moderate transfer of liquid laterally within a mat or between adjacent and contiguous mats, Individual mats may contain a multiplicity of gels or gel patterns where the individual gels are the same or different and may or may not have different thermal, pH, water or other liquid, electrical or other types of responses.

Figure 1:
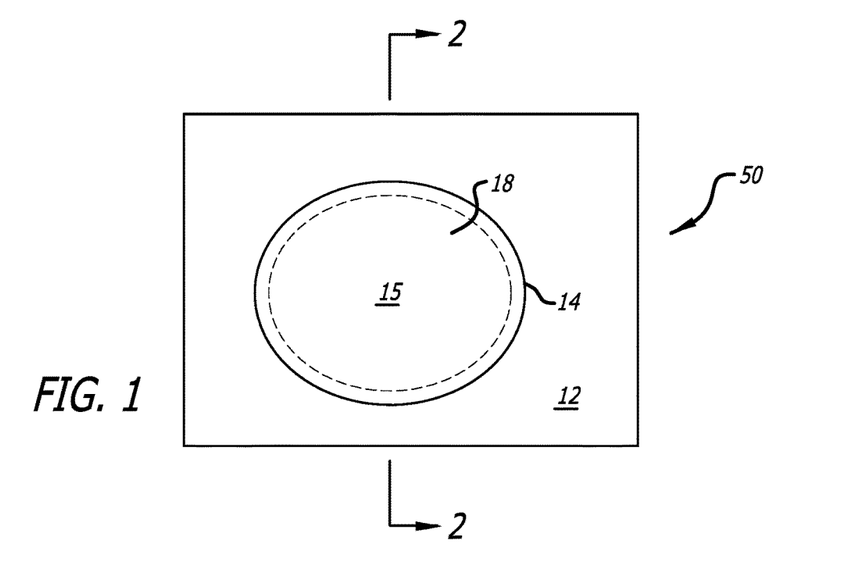
FIG. 1 is a plan view of an embodiment of a temperature indicator.
Figure 2:
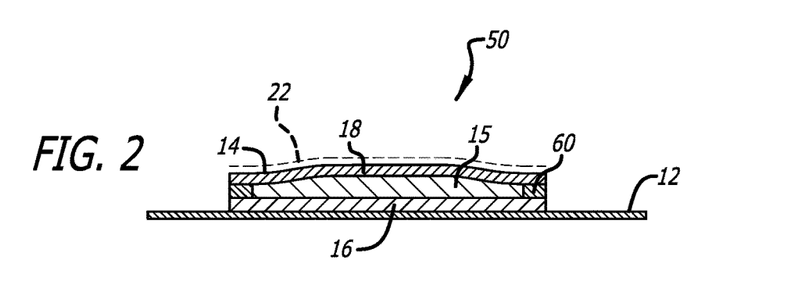
FIG. 2 is a sectional view on the line 2-2 of the temperature indicator shown in FIG. 1.
Figure 3:
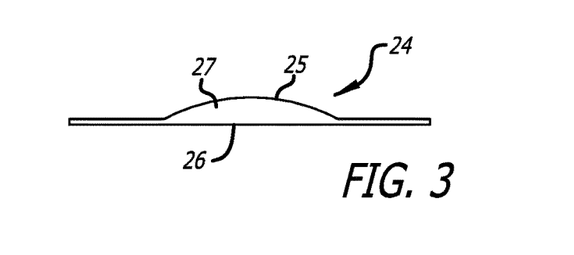
FIG. 3 is a view similar to FIG. 1 of another embodiment of a temperature indicator.

FIGS. 1-3 illustrate examples of temperature condition indicators comprising a housing and a substrate. In these figures, the housing may include any or all of the features in the drawing that are not the substrate. Referring now to FIGS. 1 and 2 of the accompanying drawings, the temperature condition indicator shown, referenced 50, includes a substrate 12 supporting an envelope 14, which contains a volume of an indicator dispersion 15, which can be any of the indicator dispersions described herein. As shown, envelope 14 can be approximately circular. Alternatively, envelope 14 can have another desired shape, for example, oval, hexagonal, square, rectangular, strip-like or ring-like. Envelope 14, as shown, includes an inner wall 16 and an outer wall 18 joined together by a ring of adhesive 60, or joined in another suitable manner, for example by fusing. Also, the joint, or seal between inner wall 16 and outer wall 18 can have low permeability to water vapor. Alternatively, envelope 14 can be a one-piece sealed sac.

Inner wall 16 of envelope 14 can be adhered to, deposited on, or otherwise attached to, substrate 12 so as to attach envelope 14 to substrate 12. Alternatively, substrate 12 can provide inner wall 16 as an integral component of the substrate. For example, inner wall 16 can include a layer, or insert, of aluminum or other material substantially impermeable to water vapor and aqueous liquids, formed integrally with substrate 12 or as a separate element.

Outer wall 18 of envelope 14 includes a transparent window (not referenced) which can occupy approximately the entire footprint of envelope 14 on substrate 12, if desired. Alternatively, the transparent window can occupy a smaller area or the entire envelope 14 can be transparent. The transparent window enables an optical signal generated by temperature condition indicator 50, for example, a change in color, to be read externally by a suitable instrument, by a human viewer, by a camera, by an optical detector, or in another suitable manner. Envelope 14 can be formed of materials having a low permeability to water vapor to protect indicator dispersion 15 from drying out, if desired. Any joint between inner wall 16 and outer wall 18 of envelope 14 also can have low water-vapor-permeability, if desired.

Optionally, outer wall 18 of envelope 14 can be provided with a color filter 22, for example, as a light-modulating coating of an ink, a lacquer, a paint, or another suitable coating material on outer wall 18. Alternatively, color filter 22, can be a separate element such as a separate layer. Color filter 22 can be transparent to enable the appearance of the indicator dispersion to be viewed through the filter. In one embodiment, color filter 22 has a transparent green color, indicator dispersion 15 is light-colored before a temperature condition is met, and is dark-colored or black after a temperature condition is met, so that the temperature condition indicator shows a change from green before a temperature condition is met to dark, or black, after a temperature condition is met.

The temperature condition indicator illustrated in FIG. 3, referenced 24, can be generally similar to that shown in FIGS. 1 and 2 with the differences that are apparent from the following description. Temperature condition indicator 24 can include an upper blister portion 25 and a lower substrate portion 26 defining between them an indicator volume 27 that can contain an indicator dispersion such as described herein. Upper blister portion 25 can be preformed from a synthetic polymeric film material, for example polyvinyl chloride. Also, substrate portion 26 can be formed in one piece with upper blister portion 25 and can be sealed to substrate portion 26 in any suitable manner, for example, by heat sealing or by use of an adhesive. Alternatively, blister portion 25 and substrate portion 26 can be formed in one piece. Temperature condition indicator 24 can be flexible, if desired, for example sufficiently flexible that substrate portion 25 can be curved into a semicircle or a circle.

Temperature condition indicator 24 can be embodied in a variety of configurations, including relatively small configurations. One illustrative example of a small embodiment of temperature condition indicator 24 has a blister diameter (or equivalent dimension) of not more than about 4 mm, a blister height (the vertical dimension in FIG. 3) of not more than about 0.6 mm, and an indicator volume of not more than about 5 μL. Another example of a larger embodiment of temperature condition indicator 24 has a blister diameter (or equivalent dimension) of about 12 mm, a blister height (the vertical dimension in FIG. 2) of about 1.2 mm, and an indicator volume of about 80 μL. These dimensions are merely exemplary and temperature condition indicator 24 can have smaller or larger configurations.

Temperature condition indicators described herein can have any suitable thickness in the direction of optical reading, for example, in the case of the temperature condition indicator illustrated in FIGS. 1 and 2, a thickness up to about 1 mm between inner wall 16 and outer wall 18 across the envelope 14 in which indicator dispersion 15 is accommodated. For some purposes, however, temperature condition indicator embodiments can have a thin or low profile, having a thickness of the indicator dispersion of from about 10 μm (microns) to about 0.3 mm, for example.

Temperature condition indicators can have various other structural characteristics including any of the structural characteristics of the freeze indicators described in U.S. Pat. No. 8,430,053. The disclosure of the '053 patent related to structural characteristics of freeze indicators is incorporated by reference herein.

Figures 4A, 5A:
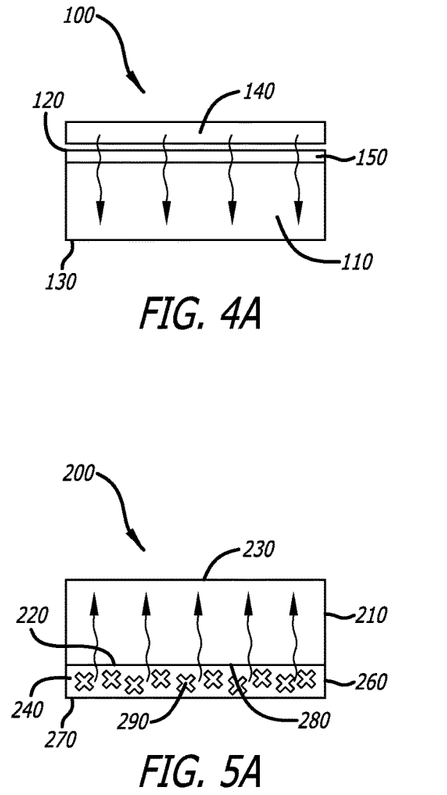
FIGS. 4A and 4B are schematic depictions of one embodiment of a gel-based temperature indicator according to the present disclosure.
FIGS. 5A and 5B are schematic depictions of one embodiment of a gel-based temperature indicator according to the present disclosure.
Figures 4B, 5B:
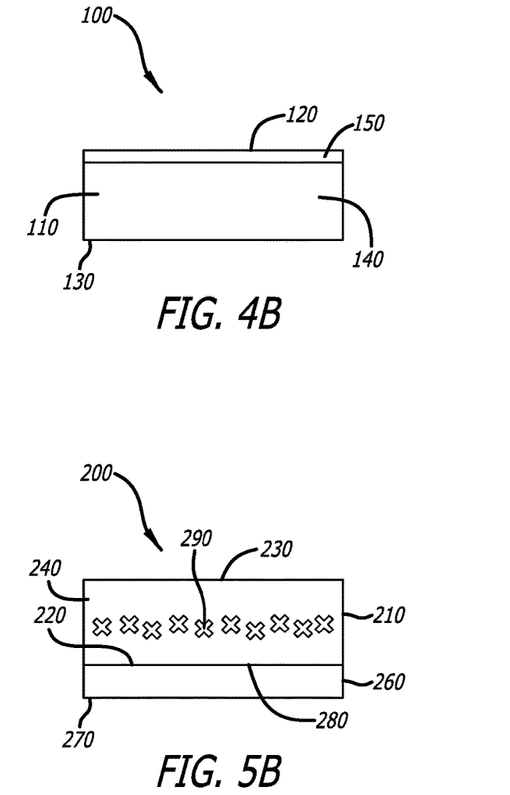

FIGS. 4A and 4B illustrate one embodiment of a gel-based temperature indicator 100 that includes first absorbent substrate 110. First absorbent substrate 110 includes first face 120 and second face 130. Coupled to first face 120 in FIG. 4A is a layer of first gel 140. First gel 140 is selected and/or configured to exhibit the properties of a solid at a first temperature and to exhibit the properties of a liquid at a second temperature. First absorbent substrate 110 is configured to allow or direct the flow of first gel 140 from first face 120 toward second face 130. Doing so affects a change in first absorbent substrate.

This represents a significant improvement over devices that require gravitational-induced separation of pigments contained within two gels oriented one on top of the other. These types of devices may require low density pigments in the lower gel to rise while high density pigments contained in the upper gel may need to sink when said gels convert to a liquid state. This means the indicator may work only in one orientation which greatly limits its utility.

Many different types of fibrous mats are contemplated by this disclosure. They may be woven or non-woven fibrous assemblies made from synthetic fibers or natural fibers. The synthetic fibers may be made by any technology such as solvent spinning, melt spinning, electrospinning, etc. Typical fibers can be polyesters, nylons, polyolefins, and the like. Mats or substrates used for filtration can be readily adapted to be used in the embodiments disclosed herein. Paper and paperboard may also be used to advantage.

The difference between the first temperature, which may be at or near the target temperature, and second temperature, which may be at or near the threshold temperature, could be about 5° C., about 10° C., about 15° C., about 20° C., about 25° C., about 30° C., between about 1° C. and about 35° C., between about 3° C. and about 20° C., between about 5° C. and about 15° C., or between about 5° C. and about 10° C.

First absorbent substrate 110, or the absorbent substrates of any other embodiment disclosed herein may comprise any number of shapes and thicknesses, though in the illustrated embodiment, first absorbent substrate 110 is relatively thin compared to the surface area of second face 130. In some embodiments, the size and configuration of the absorbent substrate can be described in terms of the ratio of the area of one of the surfaces of the substrate to the thickness of the substrate. In some embodiments, the ratio of the area of first or second face in mm to the thickness in mm (i.e., the distance from the first face to the second face) is at least about 5 mm, at least about 10 mm, at least about 20 mm, at least about 40 mm, at least about 80 mm, or at least about 100 mm. In some embodiments, the ratio of the area of first or second face in mm to the thickness in mm lies between about 10-5000 mm, between about 20-2000 mm, between about 30-1000 mm, or between about 40-1000 mm.

As illustrated in FIG. 4B, gel-based temperature indicator 100 includes a marking or visual indication 150 that is revealed when first gel 140 migrates or diffuses toward second face 130 thereby exposing first face 120. Marking 150 may comprise a pattern, at least one letter, at least one number, at least one symbol, etc. Marking 150 may be darker or lighter than first face 120. In lieu of a marking, first face 120 of gel-based temperature indicator 100 may itself serve as a visual indication of a change in the temperature. For example, first gel 140—when acting as a solid at the selected first temperature—may be configured to obscure the color or appearance of first face 120. As discussed in greater detail below, first gel 140 may be configured to scatter light when in its solid state. First gel 140 may additionally or alternatively be configured to exhibit an obscuring color such that when first gel 140 migrates toward second face 130 the color is no longer visible or obscures first face 140 to a lesser degree.

The gels used in the present disclosure can be configured to exhibit any number of colors, achieve a particular visual appearance, and/or include any number of additives. The gels may be naturally opaque and/or may include soluble dyes and reactive dyes. The visual appearance of some gels can be used to obscure a surface or pattern as mentioned above, and the visual appearance of the gels can be used to affect the visual appearance of the substrates to which the gels are adhered or the substrates through which the gels diffuse or migrate. As mentioned above, first gel 140 can be configured to obscure first face 120, which can be achieved by scattering light. This may achieved by the gel itself or by the inclusion of particles that scatter light when diffused throughout the gel. When the gel acts more like a liquid as the temperature deviates from the first temperature, the particles either move with the gel so as to no longer obscure an underlying surface or pattern or the particles may coalesce so as to reduce or eliminate their light-scattering affect.

A method of fabricating indicator 100 includes provide first substrate 110; optionally applying to or printing on first face 120 visual marking 150, which may comprise a pattern, message, etc.; applying first gel 140 to first face 120 by printing, spraying, or other coating methods; and enclosing coated first substrate 110 within a sealed enclosure having a viewing window adjacent first face 120 and an optional adhesive on a different surface.

FIGS. 5A and 5B illustrate another embodiment of a gel-based temperature indicator 200. FIG. 5A illustrates that the indicator 200 includes a first absorbent substrate 210 having a first face 220 and a second face 230. The indicator 200 also includes a second absorbent substrate 260 having a first face 270 and a second face 280. In this embodiment, second face 280 of second absorbent substrate 260 is positioned adjacent to or is secured to first face 220 of first absorbent substrate 210. In some embodiments, the respective faces of the two substrates are in direct contact with each other without any intervening layers, films, or barriers. Second absorbent substrate 260 contains a first gel 240 that includes an additive 290, which in this embodiment is configured to impart a color to first gel 240 such that when indicator 210 is exposed to a temperature greater than a certain deviation from a first temperature, first gel 240 migrates or diffuses toward first face 220 of first substrate 210 and further into first substrate 210 in the direction of second face 230, thereby affecting or changing the visual appearance of first substrate 210 as illustrated in FIG. 5B. In some embodiments, the result is that both first substrate 210 and second substrate 260 have the same visual appearance.

As shown in FIGS. 5A and 5B, first gel 240 is preloaded in second substrate 260, or second substrate 260 is impregnated with first gel 240. This can be accomplished via the absorption of the gel in its liquid state, that is to say at a temperature below (or above) as specific threshold, and then raising (or lowering) the temperature such that the liquid gels or forms a more solid state. The liquid gel may be printed or sprayed onto or into the substrate. Alternatively, the gel (in its gel state) can be pumped into the substrate under pressure. When the temperature event occurs (i.e., the ambient temperature exceeds an acceptable deviation), the gel will liquefy and can then, by capillary forces, travel into an adjacent unmodified fibrous mat or substrate providing a visual event or change in the adjacent substrate. Alternatively, a non-interacting liquid can be placed atop the gel-infused substrate and, when the gel liquefies can then travel into or through the fibrous substrate.

In some embodiments, indicator 200 does not include second substrate 260 but instead merely positions a layer of first gel 240 on first face 220 of first substrate 210. Such a configuration can be thought of as the opposite of the configuration illustrated in FIGS. 4A and 4B. First gel 240 stays on first face 220 while indicator is exposed to temperatures within a given range, and first gel 240 migrates or diffused into first substrate 210 toward second face 230 when the temperature exceeds the allowable range.

Although not drawn to scale, first substrate 210 is illustrated as being thicker than second substrate 260. In some embodiments, second substrate 260 is preloaded with a concentrated amount of first gel 240 such that when first gel 240 diffuses or migrates into first substrate 210 there is enough colorant or additive to affect the desired change in the visual appearance of first substrate 210. In some embodiments, this result is achieved by making second substrate 260 thicker than first substrate 210 so that only a small amount of first gel 240 need diffuse or migrate into first substrate 210 to effect the desired change in visual appearance.

The relative thicknesses of first substrate 210 and second substrate 260 can be described by comparing the respective ratios of the area of first or second face in mm to the thickness in mm. This comparison may itself be a ratio. For example if first face 220 has an area to thickness ratio of 10 mm and second face 230 has an area to thickness ratio of 100 mm, the two substrates together can be described as having a relative thickness of 1:10. In some embodiments, the relative thickness of the two substrates is between about 1:10 and about 10:1. In some embodiments, the relative thickness of the two substrates is about 1:1, about 1:2, about 1:3, about 1:5, about 1:8, about 8:1, about 5:1, about 3:1, or about 2:1.

In some embodiments, second face 230 of first substrate 210 includes a marking that can be obscured by the presence of first gel 240 when diffused throughout first substrate 210. In other words, before indicator 200 is exposed to a temperature exceeding a certain deviation, the marking is visible and indicates that the temperature has not yet exceeded the allowable deviation. But after being exposed to a temperature in excess of the deviation, the migration of first gel 240 toward second face 230 obscures the marking. Alternatively, second face 230 may be configured to obscure or make reading the marking difficult absent first gel 240, such as only diffusion of first gel 240 into first substrate 210 reveals the marking. For example, the marking and second face 230 have the same or similar color and first gel 240 includes a colorant that changes the color of first substrate 210 and contrasts with the color of the marking.

A method of fabricating indicator 200 includes providing first substrate 210; optionally applying to or printing on second face 230 a visual marking, pattern, message, etc.; either providing second substrate 260 impregnated with first gel 240 that includes additive 290 or applying first gel 240 with additive 290 to first face 220 by printing, spraying, or other coating methods; and enclosing coated first substrate 200 or first substrate 210 and second substrate 260 within a sealed enclosure having a viewing window adjacent second face 230 and an optional adhesive on a different surface.

Figure 6A:
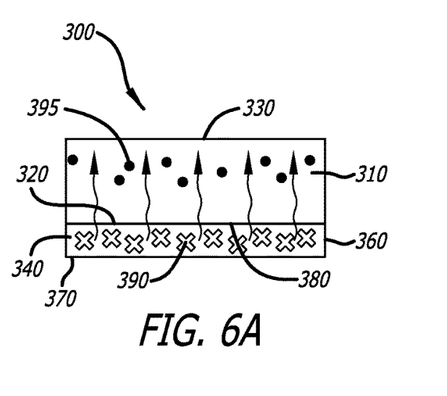
FIGS. 6A and 6B are schematic depictions of one embodiment of a gel-based temperature indicator according to the present disclosure.
Figure 6B:
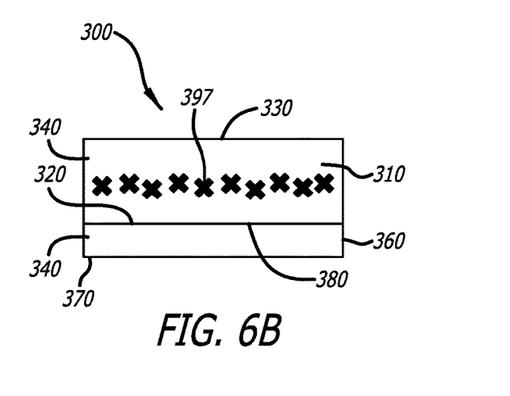

FIGS. 6A and 6B illustrate another embodiment of a gel-based temperature indicator 300. Similar to the embodiment illustrated in FIGS. 5A and 5B, indicator 300 includes a first substrate 310 and a second substrate 360, each having respective first faces 320,370 and respective second faces 330,380. However, in this embodiment, first substrate 310 includes a reactive species 395, and first gel 340 includes an additive 390 that reacts with reactive species 395. The reaction between additive 390 and reactive species 395 produces a product 397 that affects the visual appearance of first substrate 310 as shown in FIG. 6B. As in the embodiment of FIGS. 5A and 5B, this change in visual appearance may be coupled with a marking located on second face 330 of first substrate 310.

In some embodiments, indicator 300 does not include second substrate 360 but instead merely positions a layer of first gel 340 on first face 320 of first substrate 310. First gel 340 stays on first face 320 while indicator is exposed to temperatures within a given range, and first gel 340 migrates or diffused into first substrate 310 toward second face 330 allowing additive 390 to react with reactive species 395 when the temperature exceeds the given range.

Reactive species 395 and additive 390 may react in any number of ways. For example the reaction may form a new compound 397 or may affect the pH of first gel 340. Where the reaction affects the pH of the gel, first substrate 310 may comprise pH paper or other pH-reactive material so as to visually indicate a change in the pH.

A method of fabricating indicator 300 includes providing first substrate 310 impregnated with reactive species 395; optionally applying to or printing on second face 330 a visual marking, pattern, message, etc.; either providing second substrate 360 impregnated with first gel 340 that includes additive 390 or applying first gel 340 with additive 390 to first face 320 by printing, spraying, or other coating methods; and enclosing coated first substrate 310 or first substrate 310 and second substrate 360 within a sealed enclosure having a viewing window adjacent second face 330 and an optional adhesive on a different surface.

Figure 7A:
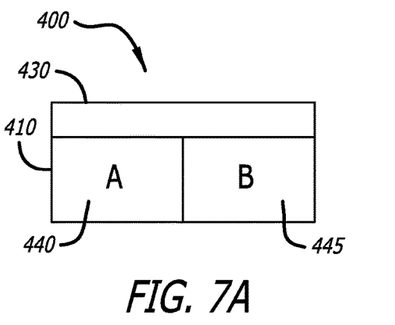
FIGS. 7A and 7B are schematic depictions of one embodiment of a gel-based temperature indicator according to the present disclosure.
Figure 7B:
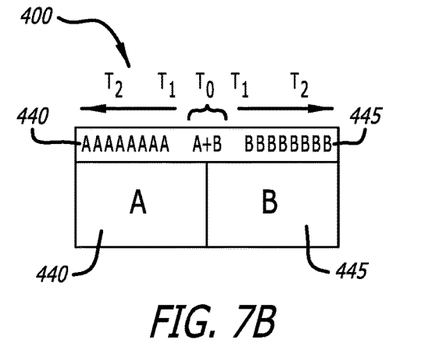

FIGS. 7A and 7B illustrate another embodiment of a gel-based temperature indicator 400 that includes two areas where gels have been formed or positioned prior to use. If desired, more than two areas and more than two gels could be used in alternative embodiments. This embodiment is capable of serving as both a high and low temperature indicator.

First gel 440 and second gel 445 are positioned in separate areas or portions of first substrate 410. Some embodiments include a physical barrier between two areas. Indicator includes a third area that is initially free of both first gel 440 and second gel 445. As shown in FIG. 7A, first gel 440 and second gel 445 remain immobile within their respective areas while indicator 400 is exposed to temperatures that do not exceed a certain deviation from a desirable temperature, such as room temperature or another suitable temperature. But when the ambient temperature exceeds an acceptable deviation from the desired temperature, first gel 440 and second gel 445 liquefy or behave more like a liquid and flow, migrate, or diffuse toward second face 430 and into the third area and interact with each other. This is shown in FIG. 7B. In some embodiments, the two gels are different colors and, when mixed, produce a third color. The width of the resulting band of the third color can provide an indication of how long indicator has been exposed to a temperature in excess of the acceptable deviation. In some embodiments, the two gels each include additives that chemically react with each other so as to produce a visual indication.

In some embodiments, the three different areas are achieved by using two or more separate absorbent substrates. For example, a second substrate may initially contain first gel 440 and second gel 445, while the third area is achieved by affixing or positioning a separate absorbent substrate (e.g., first substrate 410) next to the second substrate. In another example, three different substrates could be used, one initially impregnated with first gel 440, one initially impregnated with second gel 445, and one positioned adjacent to both of the other substrates and ready to receive first gel 440 and second gel 445 when the temperature or trigger event occurs. The gels may be encased within the substrate (or substrates) in ordered and printed patterns of any variety and shape.

In some embodiments, first gel 440 is positioned on only a portion of one side of first substrate 410, and second gel 445 is positioned on a different portion of the same side of first substrate 410. In some embodiments, the two gels are physically separate from each other. Exposure to a temperature in excess of an allowable deviation causes both gels to diffuse into first substrate 410 where the two gels interact with each other to produce a visual change in the appearance of first substrate 410.

Some embodiments according to the present disclosure comprise temperature indicators that, in addition to or instead of providing a visual indication of a temperature event, can be interrogated electronically to determine if the temperature event has occurred. This can be accomplished by printing or otherwise attaching electronic circuitry to the underside of the porous substrate. An example would be printing an element that functions as a capacitance, resistance, inductance, or combination thereof or multiplicity thereof or alternative or additionally a semiconductor device or multiplicity thereof. Such printing may be accomplished with conductive inks, well known in the art, comprising (curable) fluids containing metal particles such as silver, carbon, graphite, graphene, or another electrically conductive material. Thus, when the temperature event occurs, the liquid flows though the porous substrate making contact with the printed electronic circuitry and changing its electrical characteristics. These changes can then be detected by a contact or non-contact external electronic device.

Some embodiments include two conductive bars, not initially in contact with each other, so that when a liquefied gel containing conductive particles penetrates through the substrate it bridges the two bars increasing the conductivity between them. The extent of change can be further modified by having a soluble material dispersed within the fibrous or porous substrate that dissolves when the gel liquefies and passes into the substrate. Examples of such materials include ionic salts or compounds that become acidic or basic in contact with the liquefied gel and, for example, dissolve the conductive strips.

A similar but alternative option is to change the characteristic of an antenna that is part of the temperature indication device from a being able not to transmit or receive, that is to say a non-functioning mode to a state where it can transmit or receive. For example, the functioning mode is activated by a temperature event that liquefies a gel. These embodiments could be applied to both ascending and descending temperature indicators.

In some embodiments, an electromagnetic field is generated using an electrolyte that is released by the temperature event, thereby causing the field to be generated as the electrolyte solution touches strips of dissimilar metals (such as Cu and Zn) which then triggers a solid state switch.

Figure 8A:
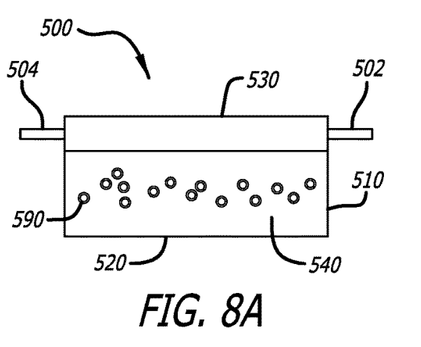
FIGS. 8A and 8B are schematic depictions of one embodiment of a gel-based temperature indicator according to the present disclosure.
Figure 8B:
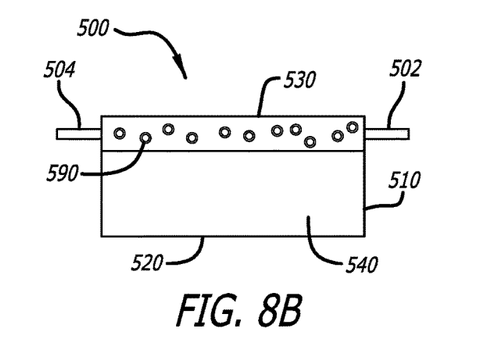

With this in mind, FIGS. 8A and 8B illustrate an embodiment of a gel-based temperature indicator 500 that utilizes conductive particles 590 to allow an electric current to flow through a first substrate 510 when exposed to a temperature in excess of an allowable deviation. First electrode 502 and second electrode 504 are in electrical communication with a portion of first substrate 510 that is initially free of conductive particles 590. First gel 540, which includes conductive particles 590, is initially located in a different portion of first substrate 510, positioned on a surface of first substrate 510, or located in a separate substrate affixed to or positioned adjacent to first substrate 510. While indicator 500 is exposed to temperatures within an allowable deviation of a desired temperature, first gel 540 and conductive particles 590 remain immobile. When the ambient temperature exceeds the allowable deviation, first gel 540 liquefies and flows or migrates into the area of first substrate 510 between first electrode 502 and second electrode 504 carrying conductive particles 590 along with it. The presence of conductive particles 590 in the area of first substrate 510 between first electrode 502 and second electrode 504 allows an electric current to flow between the two electrodes, thereby sending a signal by wire or wirelessly to a monitoring device.

In some embodiments, the occurrence of a temperature event is noted by either establishing or breaking an electrical connection between first electrode 502 and second electrode 504 or by changing the connectivity or resistivity between the two. In some embodiments, first substrate 510 absent conductive particles 590 or first gel 540 is not conductive, substantially not conductive, or exhibits reduced conductivity. Diffusion of first gel 540 into or out of the portion of first substrate 510 between first electrode 502 and second electrode 504 affects or alters (e.g., decreases or increases) the conductivity or resistivity of that portion.

In some embodiments, first electrode 502 is a positive electrode and second electrode 504 is a negative electrode. In these embodiments, the current between the electrodes is a direct current. In some embodiments, first electrode 502 and second electrode 504 are both positive or both negative. In these embodiments, the current between the electrodes is an alternating current, such as a radio frequency current. In some embodiments, the occurrence of a temperature event effects a change in the magnetic field around or near indicator 500 or between first electrode 502 and second electrode 504.

According to some embodiments, the occurrence of a temperature event (i.e., a sufficient decrease or increase in temperature) causes a loss of current between the electrodes. For example, conductive particles or a conductive medium may be present between the electrodes prior to the temperature event. This may be because first gel 540 is initially located in the portion of first substrate 510 between the electrodes. It may also or alternatively be that a substance, material, or liquid other than first gel 540 allows the current to flow between the electrodes. The occurrence of the temperature event, may cause first gel 540 to migrate away from the area between the electrodes so as to hinder or stem the flow of electric current or first gel 540 may migrate into the area between the electrodes and disrupt the flow of electric current either by interacting with the material allowing for current flow or by bringing with it a component that actively blocks current flow.

In some embodiments, first gel 510 further contains a colorant so that in addition to an electrical signal, migration of first gel 540 effects a visual change in first substrate 510.

Any number of conductive particles may be used. Suitable examples include carbon and silver. More complex circuitry may be generated by having different printed substrates stacked atop of each other so that both lateral and z-axis interactions can occur. Individual layers can have both gel and circuitry components either separately or in combination. The individual mats in the multi-stack may be made of the same or different materials.

A method of fabricating indicator 500 includes (1) providing first substrate 510; (2) impregnating a portion of first substrate 510 with first gel 540 containing conductive particles 590, or providing a separate substrate impregnated with first gel 540 containing conductive particles 590, or applying first gel 540 containing conductive particles 590 to a surface of first substrate 510; (3) connecting first electrode 502 and second electrode 504 to a portion of first substrate 510 that is initially free of conductive particles 590; and (4) enclosing indicator 500 in a sealed enclosure. An alternative method of fabricating indicator 500 includes (1) providing first substrate 510; (2) impregnating a portion of first substrate 510 with first gel 540 containing conductive particles 590, providing a separate substrate impregnated with first gel 540 containing conductive particles 590, or applying first gel 540 containing conductive particles 590 to a surface of first substrate 510; (3) enclosing indicator 500 in a sealed enclosure while allowing for electrical communication through the enclosure; and (4) connecting first electrode 502 and second electrode 504 to a portion of the enclosed indicator that is in electrical communication with a portion of first substrate 510 that is initially free of conductive particles 590.

Figure 9A:
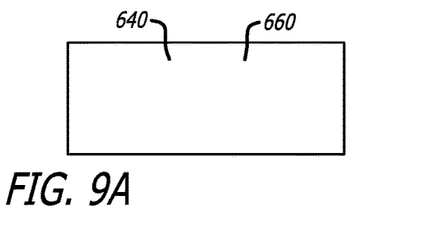
FIGS. 9A-9D are schematic depictions of one embodiment of a gel-based temperature indicator according to the present disclosure.
Figure 9B:
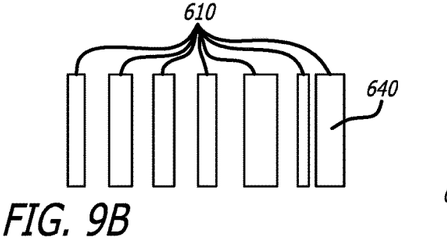
Figure 9C:
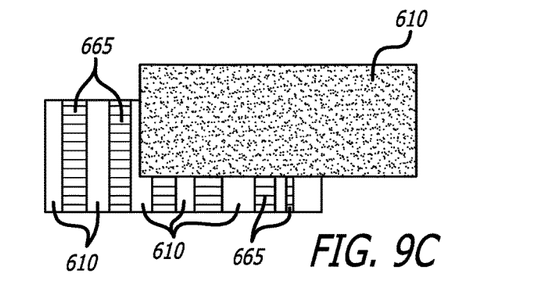

FIGS. 9A-9D illustrate yet another embodiment of a gel-based temperature indicator 600 according to the present disclosure. FIG. 9A illustrates that indicator 600 includes an initially impregnated substrate 660 impregnated with a first gel 640. Substrate 640 is cut into strips, optionally of varying width as shown in FIG. 9B. FIG. 9C illustrates that the strips are assembled in a spaced-apart arrangement on one side of a first absorbent substrate 610. A second side, which oppose the first side, acts as the viewing surface of indicator 600. FIG. 9C also illustrates the use of non-impregnated, impervious spacer strips 665, which prevent or limit diffusion of first gel 640 between the various strips of substrate 660.

The first gel 640 is configured to remain immobile within substrate 660 so long as indicator is not exposed to temperatures in excess of a specified deviation from a desired temperature. When a temperature event occurs (i.e., indicator 600 is exposed to a temperature in excess of the allowable deviation), first gel 640 liquefies or migrates into first substrate 610 to produce the pattern shown in FIG. 9D. Because of the spaced pattern of the strips of substrate 660, first gel 640 will generate a bar code on first substrate 610.

Figure 9D:
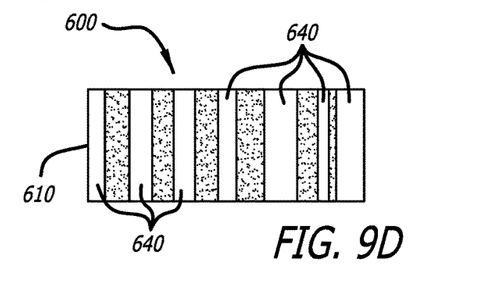

In some embodiments, the individual gel-impregnated strips can have different gels within them that respond to a range of temperature events so that the indicator can generate a full thermal history seen by the product to which the indicator is attached—all recorded in the generated bar code. In some embodiments, the reassembled strips can be cut crosswise to produce individual thermal history indicators.

In some embodiments, two sets of strips are used, each set being impregnated with a different gel. The two sets of strips are arranged together on one side of first substrate 610 in such a way that each set is capable of generating its own bar code. One gel liquefies when the temperature increases above a certain threshold, whereas the second gel liquefies when the temperature decreases below a certain threshold. In this way, an unallowable deviation below a desired temperature will generate one bar code, whereas an unallowable deviation above the desired temperature will generate a different bar code.

In some embodiments, substrate 660 is not cut into strips, but rather first substrate 610 is cut into strips of varying width and spaced apart using non-absorbent spacer strips. When the temperature exceeds an allowable deviation from a desired temperature, first gel 640 diffuses from substrate 660 into the various strips of substrate 610, thereby revealing the bar code pattern of substrate 610.

In some embodiments, substrate 610 will have already printed on it a bar code, which is readable so long as gel 640 does not diffuse into substrate 610. In some embodiments, the bar code is composed of the impervious spacer strips, such that migration of gel 640 renders the bar code unreadable.

Colored gels can be used to produce the bar code pattern. To ensure there is no fuzziness in the bar code lines caused by lateral diffusion of the colored gel the top sheet (i.e., the original backing) can itself be a composite of pervious and impervious sections. For example it can be constructed out of different materials or, for example, it can be porous and impervious sections can be printed upon it with an appropriate resin or the like. Alternatively a gel containing acid, or basic, or other groups can be used and the top sheet printed with a dye precursor so that only the printed areas will show when the gel liquefies and moves into the top sheet.

Figure 10A:
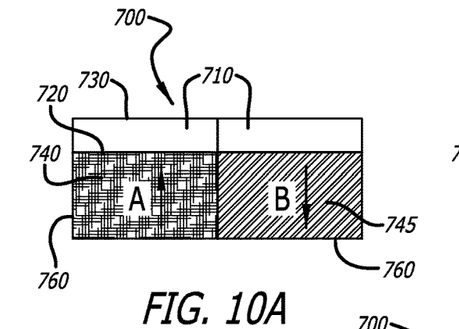
FIGS. 10A-10C are schematic depictions of one embodiment of a gel-based temperature indicator according to the present disclosure.
Figure 10B:
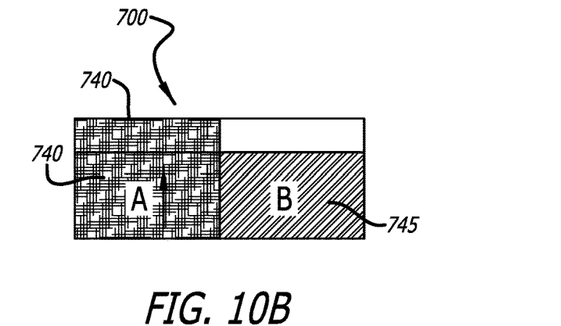
Figure 10C:
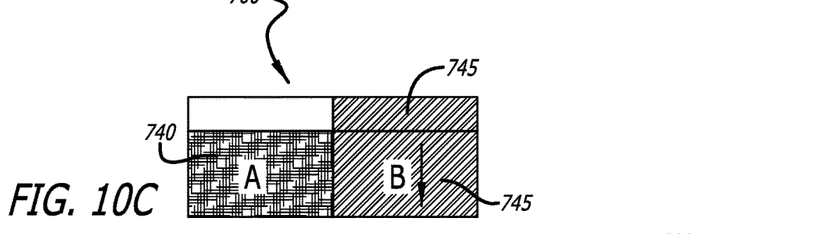

FIGS. 10A-10C illustrate a dual, gel-based temperature indicator 700 that utilizes the contrasting properties of a first gel 740 and a second gel 745, where one of the gels liquefies when the temperature increases above a certain threshold (as shown in FIG. 10B), and the other gel liquefies when the temperature decreases below a certain threshold (as shown in FIG. 10C). Indicator 700 includes a first absorbent substrate 710 have first face 720 and second face 730. Affixed or adjacent to first face 720 are first gel 740 and second gel 745, which can be coated, sprayed, painted, or otherwise applied to first face 720 or may be located within a second absorbent substrate 760.

Some embodiments further include a barrier between the two gels to prevent or reduce any mixing of the two gels. In some embodiments, first substrate 710 comprises two separate components, each physically separated from the other. Moreover, second substrate 760 may itself comprise two separate components, each physically separated from the other, such that each of the two gels are physically separated and may only migrate into its own component of first substrate 710.

Figure 11A:
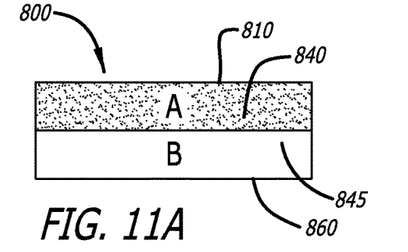
FIGS. 11A and 11B are schematic depictions of one embodiment of a gel-based temperature indicator according to the present disclosure.
Figure 11B:
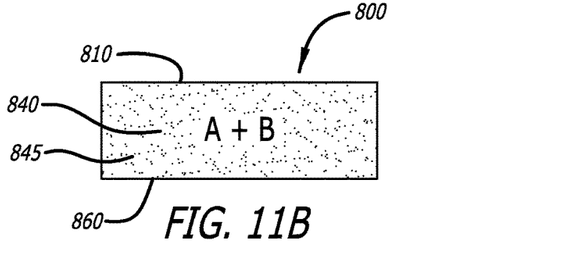

FIGS. 11A and 11B illustrate another embodiment of a gel-based temperature indicator 800 that includes a first absorbent substrate 810 initially impregnated with a first gel 840 and a second absorbent substrate 860 initially impregnated with a second gel 845. First substrate 810 and second substrate 860 are secured or affixed to each other or placed in contact (direct or indirect). While indicator 800 is exposed to a desired temperature or temperatures within an allowable deviation, first gel 840 and second gel 845 remain immobile in their respective substrates. When the temperature exceeds the allowable deviation, first gel 840 liquefies and migrates into second substrate 860. Likewise, second gel 845 liquefies and migrates into first substrate 810. In some embodiments, the first gel liquefies when a high temperature threshold is reached and the second gel liquefies when a low temperature threshold is reached. In some embodiments, the respective colors of the two gels (achieved inherently by virtue of colorants or colored additives) combine to form a third color. In some embodiments, first gel 840 and second gel 845 chemically react with other (either by their inherent natures or by virtue of added reactive species) to affect a visual change in appearance of first substrate 810 and second substrate 860.

In some embodiments, one or both of first gel 840 and second gel 845 is not initially impregnated into a substrate. For example, first substrate 810 may be impregnated with first gel 840, and second gel 845 is coated, painted, sprayed onto, or otherwise applied to at least one surface of first substrate 810. The occurrence of a temperature in excess of the allowable deviation liquefies the two gels and allows them to mix, thereby affecting the appearance of first substrate 810. In some embodiments, neither gel is impregnated in a substrate. The two gels are simply layered onto each other and prevented from mixing simply by maintaining the temperature within the allowable deviation. In some embodiments, the two gels are initially separated from each other by a non-absorbent but permeable layer. In some embodiments, the two gels are each respectively applied to opposite surfaces of a single substrate.

A method of manufacturing indicator 800 includes (1) providing first substrate 810 and second substrate 860; (2) applying first gel 840 to first substrate 810 and applying second gel 845 to second substrate 860, which can be achieved by painting, spraying, soaking, coating, etc.; (3) placing one face first substrate 810 in contact with one face of second absorbent substrate; and (4) enclosing the two substrates in a sealed enclosure that includes at least one viewing window. An alternative method includes (1) providing first substrate 810; (2) applying first gel 840 to first substrate 810; (3) applying second gel 845 to a surface of first substrate 810; and (4) enclosing the coated substrate in a sealed enclosure that includes at least one viewing window. Another alternative method includes (1) providing a layer of first gel 840 and a layer of second gel 845; (2) applying the layer of first gel 840 to the layer of second gel 845 with or without an separating layer or substrate; and (3) enclosing the two layers in a sealed enclosure that includes at least one viewing window.

Figure 12:
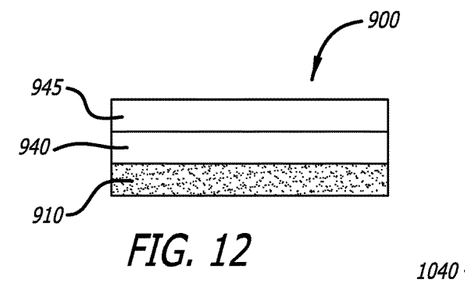
FIG. 12 is a schematic depiction of one embodiment of a gel-based temperature indicator according to the present disclosure.

FIG. 12 illustrates an embodiment of a gel-based temperature indicator 900 that utilizes a pH-sensitive substrate 910, which may be dyed as desired. Applied to one surface of substrate is a first gel 940 that has a base functionality. Further applied on top of first gel 940 is a second gel 945 that has an acid functionality. In some embodiments, the two gels are separated by a non-absorbent, permeable layer. Substrate 910, which is pH-sensitive, is selected to have a first color when exposed to a base. It exhibits this color as long as the gel layers are solid because it is in contact with a base environment.

Alternatively, first gel 940 may have an acid functionality with second gel 945 having a base functionality. In such a scenario, substrate 910 is selected to have a first color when exposed to an acid. It exhibits this color as long as the gel layers are solid because it is in contact with an acid environment.

When the gels melt in response to a temperature in excess of an allowable deviation from a desired temperature they begin to mix and the acid groups are neutralized at the boundary. However, the pH paper does not change color until enough of the acid-functional gel has diffused to consume the basic groups. There is a lag time between reaching the temperature threshold and the color change. The time lag depends on the diffusion rate and the thickness of first gel 940. In this scenario, an excess amount of second gel 945 is provided.

Figure 13:
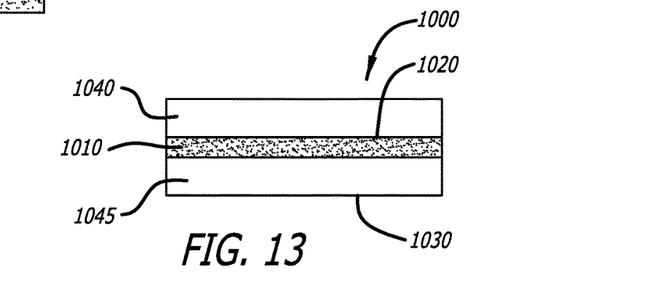
FIG. 13 is a schematic depiction of one embodiment of a gel-based temperature indicator according to the present disclosure.

FIG. 13 illustrates another embodiment of a gel-based temperature indicator 1000 that utilizes a pH-sensitive substrate 1010, which may be dyed as desired. Substrate 1010 includes first face 1020 and second face 1030. Applied to first face 1020 is a first gel 1040 that is clear or translucent and has an acid (or base) functionality. First gel 1040 is further configured to liquefy upon heating. Applied to second face 1030 is a second gel 1045 that is configured to liquefy upon cooling and has an acid (or base) functionality.

Because first gel 1040 is clear or translucent, substrate 1010 is visible at all times. While first gel 1040 is immobile or acts like a solid, substrate 1010 is visible through first gel 1040 even if the color or appearance of substrate 1010 is affected by the liquefying of second gel 1045.

A method of making indicator 1000 includes: (1) providing pH-sensitive substrate 1010; (2) applying first gel 1040 to first face 1020 of substrate 1010; (3) applying second gel 1045 to second face 1030 of substrate 1010; and (4) enclosing indicator 1000 in a sealed enclosure having a viewing window in alignment with first face 1020.

EMBODIMENTS

The following embodiments are specifically contemplated by the authors of the present disclosure:

Embodiment 1

A gel-based temperature indicator comprising: a first absorbent substrate having opposing first and second faces; a first gel coupled to the first face; wherein the first gel is a gel at a first temperature; wherein the first gel turns to liquid at a second temperature; wherein the first absorbent substrate is configured to allow the first gel upon turning to liquid to diffuse through the first face toward the second face; and wherein the ratio of the area of second face in $mm^2$ to the thickness of the first absorbent substrate in mm is at least 10 mm.

Embodiment 2

The gel-based temperature indicator of embodiment 1, wherein the first face comprises a marking that is revealed when the first gel diffuses through the first face.

Embodiment 3

The gel-based temperature indicator of embodiment 1 or 2, wherein the first gel directly contacts the first face and the first gel comprises a first additive that affects the visual appearance of the first absorbent substrate when the first gel diffuses toward the second face.

Embodiment 4

The gel-based temperature indicator of embodiment 3, wherein the first absorbent substrate comprises a second additive and diffusion of the first gel comprising the first additive allows the first and second additives to react with each other in a way that affects the visual appearance of the first absorbent substrate.

Embodiment 5

The gel-based temperature indicator of embodiment 1, 2, 3, or 4, wherein the first gel is contained within a second absorbent substrate coupled to the first face of the first absorbent substrate, and wherein the first gel comprises a first additive that affects the visual appearance of the first absorbent substrate when the first gel diffuses from the second absorbent substrate to the first face of the first absorbent substrate and further diffuses toward the second face.

Embodiment 6

The gel-based temperature indicator of embodiment 5, wherein the first absorbent substrate comprises a second additive and diffusion of the first gel comprising the first additive allows the first and second additives to react with each other in a way that affects the visual appearance of the first absorbent substrate.

Embodiment 7

The gel-based temperature indicator of embodiment 1, 2, 3, 4, 5, or 6, further comprising a second gel coupled to the first face;
wherein the second gel is a gel at the first temperature
wherein the second gel turns to liquid at the second temperature;
wherein the first absorbent substrate is configured to allow the second gel upon turning to liquid to diffuse through the first face toward the second face; and
wherein the first and second gels interact in the first absorbent substrate to effect a change in the visual appearance of the first absorbent substrate.

Embodiment 8

The gel-based temperature indicator of claim 7, wherein the extent of the change in visual appearance of the first absorbent substrate provides an indication of the amount of time that the indicator has been exposed to a temperature greater than or equal to the second temperature.

Embodiment 9

The gel-based temperature indicator of embodiment 1, 2, 3, 4, 5, 6, 7, or 8, wherein the first gel is contained within a second absorbent substrate having a third face positioned adjacent to the first face of the first absorbent substrate; and wherein a first electrode and a second electrode are positioned in physical contact with the first absorbent substrate so as to not contact each other; and wherein the first gel comprises conductive particles such that diffusion of the first gel toward the second face allows a current to flow through the first absorbent substrate.

Embodiment 10

The gel based temperature indicator of embodiment 9, wherein the flow of current between the first and second electrodes causes a signal to be sent to a remote monitoring device.

Embodiment 11

The gel based temperature indicator of embodiment 9, wherein the first electrode is a positive electrode, the second electrode is a negative electrode, and the current flowing between the electrodes is a direct current.

Embodiment 12

The gel based temperature indicator of embodiment 9, wherein the current flowing between the electrodes is an alternating current.

Embodiment 13

The gel-based temperature indicator of embodiment 1, 2, 3, 4, 5, 6, 7, 8, 9, or 10, wherein the first gel is contained within a plurality of absorbent substrates sized and positioned on the first face of the first absorbent substrate to create a pattern; and wherein diffusion of the first gel toward the second face allows the pattern to be read by a digital code-reading device.

Embodiment 14

The gel-based temperature indicator of embodiment 1, 2, 3, 4, 5, 6, 9, 10, 11, 12, or 13 further comprising a second gel located at the first face;

wherein the second gel is a gel at the first temperature wherein the second gel turns to liquid at a third temperature; and wherein the first absorbent substrate is configured to allow the second gel upon turning to liquid to diffuse through the first face toward the second face.

Embodiment 15

The gel-based temperature indicator of embodiment 14, wherein the first absorbent substrate is configured to prevent the first and second gels from mixing as they diffuse toward the second face.

Embodiment 16

The gel-based temperature indicator of embodiment 15, wherein the first and second gels are separated from each other on the first face by a barrier.

Embodiment 17

The gel-based temperature indicator of embodiment 16, wherein the first and second gels are located, respectively, in second and third absorbent substrates coupled to the first face of the first absorbent substrate.

Embodiment 18

The gel-based temperature indicator of embodiment 1, 2, 3, 4, 5, 6, 7, 8, 9, 10, 11, 12, 13, 14, 15, 16, or 17, further comprising: a second gel coupled to the second face;

wherein the second gel is a gel at the first temperature and turns to liquid at the second temperature;

wherein the first absorbent substrate is configured to allow the second gel upon turning to liquid to diffuse through the second face toward the first face; and wherein the first and second gels interact to effect a change in the visual appearance of the first absorbent substrate.

Embodiment 19

The gel-based temperature indicator of embodiment 1, 2, 3, 4, 5, 6, 7, 8, 9, 10, 11, 12, 13, 14, 15, 16, or 17, wherein the first absorbent substrate is pH-sensitive, and the first gel comprises an acid or a base configured to affect the visual appearance of the first absorbent substrate when the first gel migrates into the first absorbent substrate.

Embodiment 20

A gel-based temperature indicator comprising:

a pH-sensitive substrate;

a first gel comprising an acid;

a second gel comprising a base positioned between the first gel and the pH-sensitive substrate and in contact with the pH-sensitive substrate;

wherein the first and second gels are gels at a first temperature and turn to liquid at a second temperature; and wherein there is an excess of the acid relative to the base.

Embodiment 21

A gel-based temperature indicator comprising:

a pH-sensitive substrate having first and second faces;

a first gel comprising an acid or a base positioned on the first face of the pH-sensitive substrate; and a second gel comprising an acid or a base positioned on the second face of the pH-sensitive substrate;

wherein the first gel is a gel at a first temperature and at a second and turns to liquid at a third temperature;

wherein the second gel is a gel at the first temperature and the third temperature and turns to liquid at the second temperature;

wherein the first gel comprises an acid if the second gel comprises an acid or the first gel comprises a base if the second gel comprises a base.

Embodiment 22

The temperature indicator of embodiment 21, wherein the first gel is clear or translucent.

Embodiment 23

The gel-based temperature indicator of embodiment 1, 2, 3, 4, 5, 6, 7, 8, 9, 10, 11, 12, 13, 14, 15, 16, 17, 18, 19, 20, 21, or 22, wherein the first gel goes from gel to liquid with increasing temperature.

Embodiment 24

The gel-based temperature indicator of embodiment 1, 2, 3, 4, 5, 6, 7, 8, 9, 10, 11, 12, 13, 14, 15, 16, 17, 18, 19, 20, 21, or 22, wherein the first gel goes from gel to liquid with decreasing temperature, and the gel-based temperature indicator has a low temperature threshold below about 30° C.

Embodiment 25

The gel-based temperature indicator of claim 1, 2, 3, 4, 5, 6, 7, 8, 9, 10, 11, 12, 13, 14, 15, 16, 17, 18, 19, 20, 21, 22, 23, or 24, wherein the first absorbent substrate and the first gel are contained within a housing; wherein, if a temperature condition is met, a detectable change in appearance of the first absorbent substrate occurs; and wherein the housing is configured so that the detectable change in appearance of the first absorbent substrate is detectable externally of the temperature condition indicator by visual inspection or by an optical instrument.

Embodiment 26

The temperature condition indicator of embodiment 25, wherein the housing and the substrate are flexible.

Embodiment 27

The temperature condition indicator of embodiment 25, further comprising a host product, wherein the temperature condition indicator monitors the host product for freeze exposure.

Embodiment 28

The temperature condition indicator of embodiment 25, wherein an ordinary person can perceive the change in appearance by visual inspection.

Embodiment 29

A label for a perishable good, comprising a gel-based temperature indicator of embodiment 1, 2, 3, 4, 5, 6, 7, 8, 9, 10, 11, 12, 13, 14, 15, 16, 17, 18, 19, 20, 21, 22, 23, 24, 25, 26, 27, or 28.

Embodiment 30

A method of protecting a perishable item, comprising coupling the perishable item with a gel-based temperature indicator of embodiment 1, 2, 3, 4, 5, 6, 7, 8, 9, 10, 11, 12, 13, 14, 15, 16, 17, 18, 19, 20, 21, 22, 23, 24, 25, 26, 27, or 28 or the label of embodiment 29 so that the temperature condition indicator is subject to substantially the same temperature conditions as the perishable item.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A gel-based temperature indicator comprising:
   a first absorbent substrate having opposing first and second faces; and
   a first gel coupled to the first face;
   wherein the first gel is a gel at a first temperature;
   wherein the first gel turns to liquid at a second temperature;
   wherein the first absorbent substrate is configured to allow the first gel upon turning to liquid to diffuse through the first face toward the second face;
   wherein the first gel is contained within a second absorbent substrate coupled to the first face of the first absorbent substrate, and
   wherein the first gel comprises a first additive that affects the visual appearance of the first absorbent substrate when the first gel diffuses from the second absorbent substrate to the first face of the first absorbent substrate and further diffuses toward the second face; and
   wherein the ratio of the area of the second face in mm$^2$ to the thickness of the first absorbent substrate in mm is at least 10 mm.

2. The gel-based temperature indicator of claim 1, wherein the first absorbent substrate comprises a second additive and diffusion of the first gel comprising the first additive allows the first and second additives to react with each other in a way that affects the visual appearance of the first absorbent substrate.

3. The gel-based temperature indicator of claim 1, wherein the first gel goes from gel to liquid with increasing temperature.

4. The gel-based temperature indicator of claim 1, wherein the first gel goes from gel to liquid when the temperature decreases below a low temperature threshold, and the low temperature threshold is below 30° C.

5. A label for a perishable good, comprising a gel-based temperature indicator of claim 1.

6. A method of protecting a perishable item, comprising:
   coupling the perishable item with a gel-based temperature indicator of claim 1 so that the temperature condition indicator is subject to substantially the same temperature conditions as the perishable item.

7. The gel-based temperature indicator of claim 1, wherein the first face comprises a marking that is revealed when the first gel diffuses through the first face.

8. A gel-based temperature indicator comprising:
   a first absorbent substrate having opposing first and second faces;
   a first gel coupled to the first face; and
   a second gel coupled to the first face;
   wherein the first gel is a gel at a first temperature;
   wherein the first gel turns to liquid at a second temperature;
   wherein the second gel is a gel at the first temperature
   wherein the second gel turns to liquid at the second temperature;
   wherein the first absorbent substrate is configured to allow the first and second gels upon turning to liquid to diffuse through the first face toward the second face;
   wherein the first and second gels interact in the first absorbent substrate to effect a change in the visual appearance of the first absorbent substrate; and
   wherein the ratio of the area of the second face in mm$^2$ to the thickness of the first absorbent substrate in mm is at least 10 mm.

9. The gel-based temperature indicator of claim 8, wherein the extent of the change in visual appearance of the first absorbent substrate provides an indication of the amount of time that the indicator has been exposed to a temperature greater than or equal to the second temperature.

10. A label for a perishable good, comprising a gel-based temperature indicator of claim 8.

11. A method of protecting a perishable item, comprising:
    coupling the perishable item with a gel-based temperature indicator of claim 8 so that the temperature condition indicator is subject to substantially the same temperature conditions as the perishable item.

12. The gel-based temperature indicator of claim 8, wherein the first gel goes from gel to liquid with increasing temperature.

13. The gel-based temperature indicator of claim 8, wherein the first gel goes from gel to liquid when the temperature decreases below a low temperature threshold, and the low temperature threshold is below 30° C.

14. A gel-based temperature indicator comprising:
    a first absorbent substrate having opposing first and second faces;
    a first gel coupled to the first face;
    wherein the first gel is a gel at a first temperature;
    wherein the first gel turns to liquid at a second temperature;
    wherein the first absorbent substrate is configured to allow the first gel upon turning to liquid to diffuse through the first face toward the second face;
    wherein the first gel is contained within a second absorbent substrate having a third face positioned adjacent to the first face of the first absorbent substrate; and
    wherein a first electrode and a second electrode are positioned in physical contact with the first absorbent substrate so as to not contact each other and so that current does not flow between the first electrode and the second electrode prior to the gel turning to a liquid; and wherein the first gel comprises conductive particles such that diffusion of the first gel toward the second face allows a current to flow from the first electrode and second electrode through the first absorbent substrate.

15. The gel based temperature indicator of claim 14, wherein the flow of current between the first and second electrodes causes a signal to be sent to a remote monitoring device.

16. The gel based temperature indicator of claim 14, wherein the ratio of the area of the second face in mm$^2$ to the thickness of the first absorbent substrate in mm is at least 10 mm.

17. A label for a perishable good, comprising a gel-based temperature indicator of claim 14.

18. A method of protecting a perishable item, comprising:
coupling the perishable item with a gel-based temperature indicator of claim 14 so that the temperature condition indicator is subject to substantially the same temperature conditions as the perishable item.

19. The gel-based temperature indicator of claim 14, wherein the first gel goes from gel to liquid with increasing temperature.

20. The gel-based temperature indicator of claim 14, wherein the first gel goes from gel to liquid when the temperature decreases below a low temperature threshold, and the low temperature threshold is below 30° C.

21. A gel-based temperature indicator comprising:
a first absorbent substrate having opposing first and second faces;
a first gel coupled to the first face;
wherein the first gel is a gel at a first temperature;
wherein the first gel turns to liquid at a second temperature;
wherein the first absorbent substrate is configured to allow the first gel upon turning to liquid to diffuse through the first face toward the second face;
wherein the first gel is contained within a plurality of absorbent substrates sized and positioned on the first face of the first absorbent substrate to create a pattern;
wherein diffusion of the first gel toward the second face allows the pattern to be read by a digital code-reading device; and
wherein the ratio of the area of the second face in mm$^2$ to the thickness of the first absorbent substrate in mm is at least 10 mm.

22. A label for a perishable good, comprising a gel-based temperature indicator of claim 21.

23. A method of protecting a perishable item, comprising:
coupling the perishable item with a gel-based temperature indicator of claim 21 so that the temperature condition indicator is subject to substantially the same temperature conditions as the perishable item.

24. The gel-based temperature indicator of claim 21, wherein the first gel goes from gel to liquid with increasing temperature.

25. The gel-based temperature indicator of claim 21, wherein the first gel goes from gel to liquid when the temperature decreases below a low temperature threshold, and the low temperature threshold is below 30° C.

26. A gel-based temperature indicator comprising:
a first absorbent substrate having opposing first and second faces;
a first gel coupled to the first face; and
a second gel located at the first face;
wherein the first gel is a gel at a first temperature;
wherein the first gel turns to liquid at a second temperature;
wherein the second gel is a gel at the first temperature
wherein the second gel turns to liquid at a third temperature;
wherein the first absorbent substrate is configured to allow the first and second gels upon turning to liquid to diffuse through the first face toward the second face; and
wherein the ratio of the area of the second face in mm$^2$ to the thickness of the first absorbent substrate in mm is at least 10 mm.

27. The gel-based temperature indicator of claim 26, wherein the first absorbent substrate is configured to prevent the first and second gels from mixing as they diffuse toward the second face.

28. The gel-based temperature indicator of claim 27, wherein the first and second gels are separated from each other on the first face by a barrier.

29. The gel-based temperature indicator of claim 28, wherein the first and second gels are located, respectively, in second and third absorbent substrates coupled to the first face of the first absorbent substrate.

30. A label for a perishable good, comprising a gel-based temperature indicator of claim 26.

31. A method of protecting a perishable item, comprising:
coupling the perishable item with a gel-based temperature indicator of claim 26 so that the temperature condition indicator is subject to substantially the same temperature conditions as the perishable item.

32. The gel-based temperature indicator of claim 26, wherein the first gel goes from gel to liquid with increasing temperature.

33. The gel-based temperature indicator of claim 26, wherein the first gel goes from gel to liquid when the temperature decreases below a low temperature threshold, and the low temperature threshold is below 30° C.

34. A gel-based temperature indicator comprising:
a first absorbent substrate having opposing first and second faces;
a first gel coupled to the first face; and
a second gel coupled to the second face;
wherein the first gel is a gel at a first temperature;
wherein the first gel turns to liquid at a second temperature;
wherein the first absorbent substrate is configured to allow the first gel upon turning to liquid to diffuse through the first face toward the second face;
wherein the second gel is a gel at the first temperature and turns to liquid at the second temperature;
wherein the first absorbent substrate is configured to allow the second gel upon turning to liquid to diffuse through the second face toward the first face;
wherein the first and second gels interact to effect a change in the visual appearance of the first absorbent substrate; and
wherein the ratio of the area of the second face in mm$^2$ to the thickness of the first absorbent substrate in mm is at least 10 mm.

35. A label for a perishable good, comprising a gel-based temperature indicator of claim 34.

36. A method of protecting a perishable item, comprising:
coupling the perishable item with a gel-based temperature indicator of claim 34 so that the temperature condition indicator is subject to substantially the same temperature conditions as the perishable item.

37. The gel-based temperature indicator of claim 34, wherein the first gel goes from gel to liquid with increasing temperature.

38. The gel-based temperature indicator of claim 34, wherein the first gel goes from gel to liquid when the temperature decreases below a low temperature threshold, and the low temperature threshold is below 30° C.

\* \* \* \* \*